US006583244B1

(12) United States Patent
Jasiunas et al.

(10) Patent No.: US 6,583,244 B1
(45) Date of Patent: *Jun. 24, 2003

(54) SYNTHESIS OF RUBBER HAVING A LOW VINYL CONTENT

(75) Inventors: Chad Aaron Jasiunas, Copley, OH (US); John Robert Zuppo, III, Cuyahoga Falls, OH (US); Adel Farhan Halasa, Bath, OH (US); Wen-Liang Hsu, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/999,854

(22) Filed: Oct. 31, 2001

(51) Int. Cl.$^7$ .................................................. C08F 4/46
(52) U.S. Cl. ........................ 526/174; 526/212; 526/335; 525/332.3; 525/370; 502/154; 502/157; 502/171
(58) Field of Search ................................ 526/174, 181, 526/212, 335; 502/154, 157, 171; 525/332.3, 370

(56) References Cited

U.S. PATENT DOCUMENTS

| | | | |
|---|---|---|---|
| 4,843,120 A | 6/1989 | Halasa et al. .................. 525/53 |
| 5,047,483 A | 9/1991 | Halasa et al. ................ 525/237 |
| 5,061,765 A | 10/1991 | Hsu et al. ..................... 526/141 |
| 5,137,998 A | 8/1992 | Hsu et al. ..................... 526/174 |
| 5,239,009 A | 8/1993 | Halasa et al. ................. 525/258 |
| 5,272,220 A | 12/1993 | Rodgers et al. .......... 525/332.3 |
| 5,300,599 A | * 4/1994 | Hsu et al. ................. 526/181 X |
| 5,405,927 A | 4/1995 | Hsu et al. ..................... 526/337 |
| 5,534,592 A | * 7/1996 | Halasa et al. ................. 525/236 |
| 5,620,939 A | 4/1997 | Halasa et al. ................ 502/154 |
| 5,627,237 A | 5/1997 | Halasa et al. ................ 525/236 |
| 5,654,384 A | 8/1997 | Halasa et al. ................ 526/174 |
| 6,140,434 A | 10/2000 | Halasa et al. ................ 526/174 |
| 6,262,204 B1 | * 7/2001 | Muller et al. ................ 526/181 |

* cited by examiner

*Primary Examiner*—Fred Teskin
(74) *Attorney, Agent, or Firm*—Alvin T. Rockhill

(57) ABSTRACT

Metal salts of cyclic alcohols can be used as modifiers in lithium initiated solution polymerizations of diene monomers into rubbery polymers having a low vinyl content. For instance, such initiator systems can be used in the copolymerization of styrene and isoprene to produce low vinyl styrene-isoprene rubber having a random distribution of repeat units that are derived from styrene. It is important for such polymerizations to be conducted in the absence of polar modifiers, such as Lewis bases. The subject invention more specifically discloses an initiator system which is comprised of (a) a lithium initiator and (b) a metal salt of a cyclic alcohol, wherein said initiator system is void of polar modifiers. The present invention also discloses a process for preparing a rubbery polymer having a low vinyl content which comprises: polymerizing at least one diene monomer with a lithium initiator at a temperature which is within the range of about 5° C. to about 100° C. in the presence of a metal salt of a cyclic alcohol, wherein the molar ratio of the metal salt of the cyclic alcohol to the lithium initiator is within the range of about 0.05:1 to about 10:1, and wherein the process is conducted in the absence of polar modifiers.

15 Claims, No Drawings

SYNTHESIS OF RUBBER HAVING A LOW VINYL CONTENT

BACKGROUND OF THE INVENTION

It is highly desirable for tires to exhibit good traction characteristics on both dry and wet surfaces. However, it has traditionally been very difficult to improve the traction characteristics of a tire without compromising its rolling resistance and tread wear. Low rolling resistance is important because good fuel economy is virtually always an important consideration. Good tread wear is also an important consideration because it is generally the most important factor that determines the life of the tire.

The traction, tread wear, and rolling resistance of a tire is dependent to a large extent on the dynamic viscoelastic properties of the elastomers utilized in making the tire tread. In order to reduce the rolling resistance of a tire, rubbers having a high rebound have traditionally been utilized in making the tire's tread. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance various mixtures of styrene-butadiene rubber and polybutadiene rubber are commonly used as a rubber material for automobile tire treads. However, such blends are not totally satisfactory for all purposes.

The inclusion of styrene-butadiene rubber (SBR) in tire tread formulations can significantly improve the traction characteristics of tires made therewith. However, styrene is a relatively expensive monomer and the inclusion of SBR is tire tread formulations leads to increased costs.

Carbon black is generally included in rubber compositions that are employed in making tires and most other rubber articles. It is desirable to attain the best possible dispersion of the carbon black throughout the rubber to attain optimized properties. It is also highly desirable to improve the interaction between the carbon black and the rubber. By improving the affinity of the rubber compound to the carbon black, physical properties can be improved. Silica can also be included in tire tread formulations to improve rolling resistance.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about −110° C. to −20° C. and exhibit a second glass transition temperature which is within the range of about −50° C. to 0° C. According to U.S. Pat. No. 4,843,120, these polymers are made by polymerizing at least one conjugated diolefin monomer in a first reaction zone at a temperature and under conditions sufficient to produce a first polymeric segment having a glass transition temperature which is between −110° C. and −20° C. and subsequently continuing said polymerization in a second reaction zone at a temperature and under conditions sufficient to produce a second polymeric segment having a glass transition temperature which is between −20° C. and 20° C. Such polymerizations are normally catalyzed with an organolithium catalyst and are normally carried out in an inert organic solvent.

U.S. Pat. No. 5,137,998 discloses a process for preparing a rubbery terpolymer of styrene, isoprene, and butadiene having multiple glass transition temperatures and having an excellent combination of properties for use in making tire treads which comprises: terpolymerizing styrene, isoprene and 1,3-butadiene in an organic solvent at a temperature of no more than about 40° C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur cured rubber composition comprised of, based on 100 parts by weight rubber (phr), (A) about 10 to about 90 parts by weight of a styrene, isoprene, butadiene terpolymer rubber (SIBR), and (B) about 70 to about 30 weight percent of at least one of cis 1,4-polyisoprene rubber and cis 1,4-polybutadiene rubber wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about −10° C. to about −40° C. and, further the said bound butadiene structure contains about 30 to about 40 percent 1,2-vinyl units, the said bound isoprene structure contains about 10 to about 30 percent 3,4-units, and the sum of the percent 1,2-vinyl units of the bound butadiene and the percent 3,4-units of the bound isoprene is in the range of about 40 to about 70 percent.

U.S. Pat. No. 5,272,220 discloses a styrene-isoprene-butadiene rubber which is particularly valuable for use in making truck tire treads which exhibit improved rolling resistance and tread wear characteristics, said rubber being comprised of repeat units which are derived from about 5 weight percent to about 20 weight percent styrene, from about 7 weight percent to about 35 weight percent isoprene, and from about 55 weight percent to about 88 weight percent 1,3-butadiene, wherein the repeat units derived from styrene, isoprene and 1,3-butadiene are in essentially random order, wherein from about 25% to about 40% of the repeat units derived from the 1,3-butadiene are of the cis-microstructure, wherein from about 40% to about 60% of the repeat units derived from the 1,3-butadiene are of the trans-microstructure, wherein from about 5% to about 25% of the repeat units derived from the 1,3-butadiene are of the vinyl-microstructure, wherein from about 75% to about 90% of the repeat units derived from the isoprene are of the 1,4-microstructure, wherein from about 10% to about 25% of the repeat units derived from the isoprene are of the 3,4-microstructure, wherein the rubber has a glass transition temperature which is within the range of about −90° C. C to about −70° C., wherein the rubber has a number average molecular weight which is within the range of about 150,000 to about 400,000, wherein the rubber has a weight average molecular weight of about 300,000 to about 800,000, and wherein the rubber has an inhomogeneity which is within the range of about 0.5 to about 1.5.

U.S. Pat. No. 5,239,009 reveals a process for preparing a rubbery polymer which comprises: (a) polymerizing a conjugated diene monomer with a lithium initiator in the substantial absence of polar modifiers at a temperature which is within the range of about 5° C. to about 100° C. C to produce a living polydiene segment having a number average molecular weight which is within the range of about 25,000 to about 350,000; and (b) utilizing the living polydiene segment to initiate the terpolymerization of 1,3-butadiene, isoprene, and styrene, wherein the terpolymerization is conducted in the presence of at least one polar modifier at a temperature which is within the range of about 5° C. to about 70° C. to produce a final segment which is comprised of repeat units which are derived from 1,3-butadiene, isoprene, and styrene, wherein the final segment has a number average molecular weight which is within the range of about 25,000 to about 350,000. The rubbery polymer made by this process is reported to be useful for improving the wet skid resistance and traction characteristics of tires without sacrificing tread wear or rolling resistance.

U.S. Pat. No. 5,061,765 discloses isoprene-butadiene copolymers having high vinyl contents which can reportedly be employed in building tires which have improved traction, rolling resistance, and abrasion resistance. These high vinyl isoprene-butadiene rubbers are synthesized by copolymerizing 1,3-butadiene monomer and isoprene monomer in an organic solvent at a temperature which is within the range of about −10° C. to about 100° C. in the presence of a catalyst system which is comprised of (a) an organoiron compound, (b) an organoaluminum compound, (c) a chelating aromatic amine, and (d) a protonic compound; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and herein the molar ratio of the protonic compound to the organoaluminum compound is within the range of about 0.001:1 to about 0.2:1.

U.S. Pat. No. 5,405,927 discloses an isoprene-butadiene rubber which is particularly valuable for use in making truck tire treads, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3% to about 10% of the repeat units in said rubber are 1,2-polybutadiene units, wherein from about 50% to about 70% of the repeat units in said rubber are 1,4-polybutadiene units, wherein from about 1% to about 4% of the repeat units in said rubber are 3,4-polyisoprene units, wherein from about 25% to about 40% of the repeat units in the polymer are 1,4-polyisoprene units, wherein the rubber has a glass transition temperature which is within the range of about −90° C. to about −75° C., and wherein the rubber has a Mooney viscosity which is within the range of about 55 to about 140.

U.S. Pat. No. 5,654,384 discloses a process for preparing high vinyl polybutadiene rubber which comprises polymerizing 1,3-butadiene monomer with a lithium initiator at a temperature which is within the range of about 5° C. to about 100° C. in the presence of a sodium alkoxide and a polar modifier, wherein the molar ratio of the sodium alkoxide to the polar modifier is within the range of about 0.1:1 to about 10:1; and wherein the molar ratio of the sodium alkoxide to the lithium initiator is within the range of about 0.05:1 to about 10:1. By utilizing a combination of sodium alkoxide and a conventional polar modifier, such as an amine or an ether, the rate of polymeriztion initiated with organolithium compounds can be greatly increased with the glass transition temperature of the polymer produced also being substantially increased. The rubbers synthesized using such catalyst systems also exhibit excellent traction properties when compounded into tire tread formulations. This is attributable to the unique macrostructure (random branching) of the rubbers made with such catalyst systems.

U.S. Pat. No. 5,620,939, U.S. Pat. No. 5,627,237, and U.S. Pat. No. 5,677,402 also disclose the use of sodium salts of saturated aliphatic alcohols as modifiers for lithium initiated solution polymerizations. Sodium t-amylate is a preferred sodium alkoxide by virtue of its exceptional solubility in non-polar aliphatic hydrocarbon solvents, such as hexane, which are employed as the medium for such solution polymerizations. However, using sodium t-amylate as the polymerization modifier in commercial operations where recycle is required can lead to certain problems. These problems arise due to the fact that sodium t-amylate reacts with water to form t-amyl alcohol during steam stripping in the polymer finishing step. Since t-amyl alcohol forms an azeotrope with hexane, it co-distills with hexane and thus contaminates the feed stream.

U.S. Pat. No. 6,140,434 discloses a process for preparing a rubbery polymer having a high vinyl content which comprises: polymerizing at least one diene monomer with a lithium initiator at a temperature which is within the range of about 5° C. to about 100° C. in the presence of a metal salt of a cyclic alcohol and a polar modifier, wherein the molar ratio of the metal salt of the cyclic alcohol to the polar modifier is within the range of about 0.1:1 to about 10:1; and wherein the molar ratio of the metal salt of the cyclic alcohol to the lithium initiator is within the range of about 0.05:1 to about 10:1. U.S. Pat. No. 6,140,434 is based upon the discovery that metal salts of cyclic alcohols will act as highly effective modifiers that do not co-distill with hexane or form compounds during steam stripping which co-distill with hexane. The use of metal salts of cyclic alcohols accordingly solves the problem of recycle stream contamination. Additionally, these modifiers provide similar modification efficiencies to sodium t-amylate. Since the boiling points of these metal salts of cyclic alcohols are very high, they do not co-distill with hexane and contaminate recycle streams. Metal salts of cyclic alcohols are also considered to be environmentally safe. In fact, sodium mentholate is used as a food additive.

SUMMARY OF THE INVENTION

The subject invention is based upon the discovery that conjugated diolefin monomers can be polymerized into rubbery polymers having a low vinyl content using initiator systems that are comprised of (a) a lithium initiator and (b) a metal salt of a cyclic alcohol, wherein the polymerization is conducted in the absence of polar modifiers, such as Lewis bases. These initiator systems can also be used in the copolymerization of conjugated diolefin monomers and vinyl aromatic monomers into rubbery polymers having a low vinyl content and a random distribution of repeat units that are derived from the vinyl aromatic monomer. The initiator systems of this invention have proven to be of particular value in the copolymerization of styrene and isoprene into low vinyl styrene-isoprene rubber having a random distribution of repeat units that are derived from styrene.

Metal salts of cyclic alcohols are highly effective modifiers that provide similar modification efficiencies to sodium t-amylate. In light of the fact that they do not co-distill with hexane or form compounds during steam stripping which co-distill with hexane the contamination of recycle streams is not a problem. Additionally, these modifiers are considered to be environmentally safe. In fact, sodium mentholate is used as a food additive.

The subject invention more specifically discloses an initiator system which is comprised of (a) a lithium initiator and (b) a metal salt of a cyclic alcohol, wherein said initiator system is void of polar modifiers, and wherein the molar ratio of the metal salt of the cyclic alcohol to the lithium initiator is within the range of about 0.01:1 to about 20:1.

The present invention also discloses a process for preparing a rubbery polymer having a low vinyl content which comprises: polymerizing at least one diene monomer with a lithium initiator at a temperature which is within the range of about 5° C. to about 100° C. in the presence of a metal salt of a cyclic alcohol, wherein the molar ratio of the metal salt of the cyclic alcohol to the lithium initiator is within the range of about 0.05:1 to about 10:1, and wherein the process is conducted in the absence of polar modifiers.

The present invention also discloses a process for preparing a styrene-isoprene rubber having a low vinyl content and a random distribution of repeat units that are derived from styrene which comprises: copolymerizing styrene and isoprene with a lithium initiator at a temperature which is within the range of about 5° C. to about 100° C. in the presence of a metal salt of a cyclic alcohol, wherein the molar ratio of the metal salt of the cyclic alcohol to the lithium initiator is within the range of about 0.05:1 to about 10:1, and wherein the process is conducted in the absence of polar modifiers.

DETAILED DESCRIPTION OF THE INVENTION

The polymerizations of this invention are normally carried out as solution polymerizations in an inert organic medium utilizing a lithium catalyst. However, metal salts of cyclic alcohols can also be employed in accordance with this invention as modifiers for bulk polymerizations or vapor phase polymerizations. In order to attain a low vinyl content it is important of conduct the polymerization is the absence of polar modifiers, such as Lewis bases.

The rubbery polymers synthesized using the initiator systems of this invention can be made by the homopolymerization of a conjugated diolefin monomer or by the copolymerization of a conjugated diolefin monomer with a vinyl aromatic monomer. It is, of course, also possible to make rubbery polymers by polymerizing a mixture of conjugated diolefin monomers with one or more ethylenically unsaturated monomers, such as vinyl aromatic monomers. The conjugated diolefin monomers which can be utilized in the synthesis of rubbery polymers in accordance with this invention generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Some representative examples of ethylenically unsaturated monomers that can potentially be copolymerized into rubbery polymers using the modifiers of this invention include alkyl acrylates, such as methyl acrylate, ethyl acrylate, butyl acrylate, methyl methacrylate and the like; vinylidene monomers having one or more terminal CH2=CH— groups; vinyl aromatics such as styrene, α-methylstyrene, bromostyrene, chlorostyrene, fluorostyrene and the like; α-olefins such as ethylene, propylene, 1-butene and the like; vinyl halides, such as vinylbromide, chloroethane (vinylchloride), vinylfluoride, vinyliodide, 1,2-dibromoethene, 1,1-dichloroethene (vinylidene chloride), 1,2-dichloroethene and the like; vinyl esters, such as vinyl acetate; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide and the like.

Rubbery polymers which are copolymers of one or more diene monomers with one or more other ethylenically unsaturated monomers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubbers which contain from 50 to 95 weight percent conjugated diolefin monomers and from 5 to 50 weight percent vinylaromatic monomers, are useful in many applications.

Vinyl aromatic monomers are probably the most important group of ethylenically unsaturated monomers that are commonly incorporated into polydienes. Such vinyl aromatic monomers are, of course, selected so as to be copolymerizable with the conjugated diolefin monomers being utilized. Generally, any vinyl aromatic monomer which is known to polymerize with organolithium initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 1-vinylnaphthalene, 2-vinylnaphthalene, α-methylstyrene, 4-phenylstyrene, 3-methylstyrene and the like.

Some representative examples of rubbery polymers which can synthesized in accordance with this invention include polybutadiene, polyisoprene, styrene-butadiene rubber (SBR), α-methylstyrene-butadiene rubber, α-methylstyrene-isoprene rubber, styrene-isoprene-butadiene rubber (SIBR), styrene-isoprene rubber (SIR), isoprene-butadiene rubber (IBR), α-methylstyrene-isoprene-butadiene rubber and α-methylstyrene-styrene-isoprene-butadiene rubber. Low vinyl styrene-isoprene rubber having a random distribution of repeat units that are derived from styrene has proven to be particularly important for utilization in making tire tread compounds.

In solution polymerizations the inert organic medium which is utilized as the solvent will typically be a hydrocarbon which is liquid at ambient temperatures which can be one or more aromatic, paraffinic or cycloparaffinic compounds. These solvents will normally contain from 4 to 10 carbon atoms per molecule and will be liquids under the conditions of the polymerization. It is, of course, important for the solvent selected to be inert. The term "inert" as used herein means that the solvent does not interfere with the polymerization reaction or react with the polymers made thereby. Some representative examples of suitable organic solvents include pentane, isooctane, cyclohexane, normal hexane, benzene, toluene, xylene, ethylbenzene and the like, alone or in admixture. Saturated aliphatic solvents, such as cyclohexane and normal hexane, are most preferred.

The lithium initiators that are used in the initiator systems of this invention are typically organolithium compounds. The organolithium compounds which are preferred can be represented by the formula: R-Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium. Organo monolithium compounds, such as alkyllithium compounds and aryllithium compounds, are usually employed. Some representative examples of preferred organo monolithium compounds that can be utilized include ethylaluminum, isopropylaluminum, n-butyllithium, secondary-butyllithium, normal-hexyllithium, tertiary-octyllithium, phenyllithium, 2-napthyllithium, 4-butylphenyllithium, 4-phenylbutyllithium, cyclohexyllithium, and the like. Normal-butyllithium and secondary-butyllithium are highly preferred lithium initiators.

The amount of lithium catalyst utilized will vary from one organolithium compound to another and with the molecular weight that is desired for the rubber being synthesized. As a general rule, in all anionic polymerizations the molecular weight (Mooney viscosity) of the polymer produced is inversely proportional to the amount of catalyst utilized. Normally, from about 0.01 phm (parts per hundred parts by weight of monomer) to 1 phm of the lithium catalyst will be employed. In most cases, from 0.01 phm to 0.1 phm of the lithium catalyst will be employed with it being preferred to utilize 0.025 phm to 0.07 phm of the lithium catalyst.

Typically, from about 5 weight percent to about 35 weight percent of the monomer will be charged into the polymerization medium (based upon the total weight of the polymerization medium including the organic solvent and monomer). In most cases, it will be preferred for the polymerization medium to contain from about 10 weight percent to about 30 weight percent monomer. It is typically more preferred for the polymerization medium to contain from about 20 weight percent to about 25 weight percent monomer.

The polymerization temperature will normally be within the range of about 5° C. to about 100° C. For practical reasons and to attain the desired microstructure the polymerization temperature will preferably be within the range of about 40° C. to about 90° C. Polymerization temperatures within the range of about 60° C. to about 90° C. are most preferred. The microstructure of the rubbery polymer is somewhat dependent upon the polymerization temperature. For example, it is known that higher temperatures result in lower vinyl contents (lower levels of 1,2-microstructure). Accordingly, the polymerization temperature will be determined with the desired microstructure of the polybutadiene rubber being synthesized being kept in mind.

The polymerization is allowed to continue until essentially all of the monomer has been exhausted. In other words, the polymerization is allowed to run to completion. Since a lithium catalyst is employed to polymerize the monomer, a living polymer is produced. The living polymer synthesized will have a number average molecular weight that is within the range of about 25,000 to about 700,000. The rubber synthesized will more typically have a number average molecular weight that is within the range of about 150,000 to about 400,000.

To maintain a low vinyl content the polymerization is carried out in the absence of polar modifiers. Ethers and tertiary amines which act as Lewis bases are representative examples of polar modifiers that must be avoided. Some specific examples of polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like.

The polymerization medium should also be void of modifier such as 1,2,3-trialkoxybenzenes or a 1,2,4-trialkoxybenzenes. Some representative examples of 1,2,3-trialkoxybenzenes include 1,2,3-trimethoxybenzene, 1,2,3-triethoxybenzene, 1,2,3-tributoxybenzene, 1,2,3-trihexoxybenzene, 4,5,6-trimethyl-1,2,3-trimethoxybenzene, 4,5,6-tri-n-pentyl-1,2,3-triethoxybenzene, 5-methyl-1,2,3-trimethoxybenzene, and 5-propyl-1,2,3-trimethoxybenzene. Some representative examples of 1,2,4-trialkoxybenzenes that can be used include 1,2,4-trimethoxybenzene, 1,2,4-triethoxybenzene, 1,2,4-tributoxybenzene, 1,2,4-tripentoxybenzene, 3,5,6-trimethyl-1,2,4-trimethoxybenzene, 5-propyl-1,2,4-trimethoxybenzene, and 3,5-dimethyl-1,2,4-trimethoxybenzene. Some additional examples of modifiers that should be avoided include dipiperidinoethane, dipyrrolidinoethane, tetramethylethylene diamine, diethylene glycol, dimethyl ether and tetrahydrofuran. U.S. Pat. No. 4,022,959 describes ethers and tertiary amines that can as polar modifiers in greater detail. The 1,2,3-trialkoxybenzenes and 1,2,4-trialkoxybenzenes that act as modifiers are described in greater detail in U.S. Pat. No. 4,696,986. The teachings of U.S. Pat. No. 4,022,959 and U.S. Pat. No. 4,696,986 are incorporated herein by reference in their entirety.

The metal salt of the cyclic alcohol will typically be a Group Ia metal salt. Lithium, sodium, potassium, rubidium, and cesium salts are representative examples of such salts with lithium, sodium, and potassium salts being preferred. Sodium salts are typicaly the most preferred. The cyclic alcohol can be mono-cyclic, bi-cyclic or tri-cyclic and can be aliphatic or aromatic. They can be substituted with 1 to 5 hydrocarbon moieties and can also optionally contain hetero-atoms. For instance, the metal salt of the cyclic alcohol can be a metal salt of a di-alkylated cyclohexanol, such as 2-isopropyl-5-methylcyclohexanol or 2-t-butyl-5-methylcyclohexanol. These salts are preferred because they are soluble in hexane. Metal salts of disubstituted cyclohexanol are highly preferred because they are soluble in hexane and provide similar modification efficiencies to sodium t-amylate. Sodium mentholate is the most highly preferred metal salt of a cyclic alcohol that can be empolyed in the practice of this invention. Metal salts of thymol can also be utilized. The metal salt of the cyclic alcohol can be prepared by reacting the cyclic alcohol directly with the metal or another metal source, such as sodium hydride, in an aliphatic or aromatic solvent.

The molar ratio of the metal salt of the cyclic alcohol to the lithium initiator will normally be within the range of about 0.01:1 to about 20:1. It is generally preferred for the molar ratio of the metal salt of the cyclic alcohol to the lithium initiator to be within the range of about 0.05:1 to about 10:1. It is generally more preferred for the molar ratio of the metal salt of the cyclic alcohol to the lithium initiator to be within the range of about 0.2:1 to about 3:1.

After the polymerization has been completed, the living rubbery polymer can optionally be coupled with a suitable coupling agent, such as a tin tetrahalide or a silicon tetrahalide. The rubbery polymer is then recovered from the organic solvent. The polydiene rubber can be recovered from the organic solvent and residue by any means, such as decantation, filtration, centrification and the like. It is often desirable to precipitate the rubbery polymer from the organic solvent by the addition of lower alcohols containing from about 1 to about 4 carbon atoms to the polymer solution. Suitable lower alcohols for precipitation of the rubbery polymer from the polymer cement include methanol, ethanol, isopropyl alcohol, normal-propyl alcohol and t-butyl alcohol. The utilization of lower alcohols to precipitate the rubber from the polymer cement also "kills" the living polymer by inactivating lithium end groups. After the rubbery polymer is recovered from the solution, steam stripping can be employed to reduce the level of volatile organic compounds in the polymer. The inert solvent and residual monomer can then be recycled for subsequent polymerization.

There are valuable benefits associated with utilizing polydiene rubber made with the initiator systems of this invention in tire tread compounds. For instance, tire tread compounds with improved traction characteristics can be made by blending the styrene-isoprene rubber having a low vinyl content and a random distribution of styrene repeat units into tire tread compounds. This styrene-isoprene rubber will typically have a bound styrene content which is within the range of about 5 weight percent to about 60 weight percent and a glass transition temperature that is within the range of about −70° C. to about 10° C. The styrene-isoprene rubber will more typically have a bound styrene content which is within the range of about 30 weight percent to about 50 weight percent and a glass transition temperature that is within the range of about −45° C. to about −15° C. The glass transition temperature of the styrene-isoprene polymer will vary with its bound styrene content. As a general rule, the glass transition temperature of the styrene-isoprene polymer is raised by 1° C. for every 1% increase in the bound styrene content of the polymer.

The traction characteristics of a tire tread compound can be improved by simply blending up to about 50 weight percent of the styrene-isoprene rubber into a conventional tire tread compound. For example, the styrene-isoprene rubber can be used as a replacement for 3,4-polyisoprene which is sometimes used in tire tread compounds to improve traction characteristics. Blends of the styrene-isoprene rubber with high cis-1,4-polybutadiene rubber having a glass transition temperature that is within the range of about −110° C. to about −100° C. and/or low cis-1,4-polybutadine rubber having a glass transition temperature that is within the range of about −70° C. to about −30° C. have proven to be beneficial for improving tire traction characteristics without compromising the rolling resistance or tread-wear of the tire. Such blends will typically contain from about 5 phr (parts per 100 parts by weight of rubber) to 50 phr of the styrene-isoprene rubber and 50 phr to 95 phr of the low cis-1,4-polybutadiene rubber and/or the high cis-1,4-polybutadiene rubber. Such blends will more typically contain from about 20 phr to 40 phr of the styrene-isoprene rubber and 60 phr to 80 phr of the low cis-1,4-polybutadiene rubber and/or the high cis-1,4-polybutadiene rubber.

Tire tread compounds can also be made by blending the styrene-isoprene rubber with natural rubber. Such a tire tread compound can be made by blending about 30 phr to about 70 phr of the styrene-isoprene rubber with about 30 phr to 70 phr of natural rubber. Styrene-butadiene rubber can also be included in such tire tread compounds. For instance, a tire tread compound can be made by blending about 5 phr to about 50 phr of the styrene-isoprene rubber, about 5 phr to about 50 phr of natural rubber, and about 5 phr to about 50 phr of styrene-butadiene rubber. The styrene-butadiene rubber included in such blends can be made by solution or emulsion polymerization.

Such polydiene rubber blends can be compounded utilizing conventional ingredients and standard techniques. For instance, styrene-isoprene rubber blends will typically be mixed with carbon black and/or silica, sulfur, fillers, accelerators, oils, waxes, scorch inhibiting agents, and processing aids. In most cases, the styrene-isoprene rubber blends will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 to 150 phr of at least one filler will be utilized in the blend with 30 to 80 phr being preferred. In most cases at least some carbon black will be utilized in the filler. The filler can, of course, be comprised totally of carbon black. Silica can be included in the filler to improve tear resistance and heat build up. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the tread compound blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The polybutadiene blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers, and 0 to 1 phr of scorch inhibiting agents.

To fully realize the total advantages of such styrene-isoprene rubber blends, silica will normally be included in the tread rubber formulation. The processing of the styrene-isoprene rubber blend is normally conducted in the presence of a sulfur containing organosilicon compound to realize maximum benefits. Examples of suitable sulfur containing organosilicon compounds are of the formula:

$$Z\text{-Alk-}S_n\text{-Alk-}Z \qquad (I)$$

in which Z is selected from the group consisting of

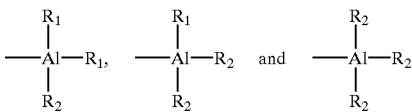

where $R^1$ is an alkyl group of 1 to 4 carbon atoms, cyclohexyl or phenyl; wherein $R^2$ is alkoxy of 1 to 8 carbon atoms, or cycloalkoxy of 5 to 8 carbon atoms; and wherein Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis (triethoxysilylpropyl) octasulfide, 3,3'-bis (trimethoxysilylpropyl) tetrasulfide, 2,2'-bis (triethoxysilylethyl) tetrasulfide, 3,3'-bis (trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis (tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis (methoxydiethoxysilylethyl) tetrasulfide, 2,2'-bis (tripropoxysilylethyl) pentasulfide, 3,3'-bis (tricyclonexoxysilylpropyl) tetrasulfide, 3,3'-bis (tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxysilylpropyltetrasulfide, 2,2'-bis(dimethyl methoxysilylethyl) disulfide, 2,2'-bis(dimethyl sec.butoyxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis (triethoxysilylpropyl) tetrasulfide. Therefore as to formula I, preferably Z is

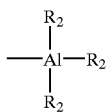

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound of formula I in a rubber composition will vary depending on the level of silica that is used. Generally speaking, the amount of the compound of formula I will range from about 0.01 to about 1.0 parts by weight per part by weight of the silica. Preferably, the amount will range from about 0.02 to about 0.4 parts by weight per part by weight of the silica. More preferably the amount of the compound of formula I will range from about 0.05 to about 0.25 parts by weight per part by weight of the silica.

In addition to the sulfur containing organosilicon, the rubber composition should contain a sufficient amount of silica, and carbon black, if used, to contribute a reasonably high modulus and high resistance to tear. The silica filler may be added in amounts ranging from about 10 phr to about 250 phr. Preferably, the silica is present in an amount ranging from about 15 phr to about 80 phr. If carbon black is also present, the amount of carbon black, if used, may vary. Generally speaking, the amount of carbon black will vary from about 5 phr to about 80 phr. Preferably, the amount of carbon black will range from about 10 phr to about 40 phr. It is to be appreciated that the silica coupler may be used in conjunction with a carbon black, namely pre-mixed with a carbon black prior to addition to the rubber composition, and such carbon black is to be included in the aforesaid amount of carbon black for the rubber composition formulation. In any case, the total quantity of silica and carbon black will be at least about 30 phr. The combined weight of the silica and carbon black, as hereinbefore referenced, may be as low as about 30 phr, but is preferably from about 45 to about 130 phr.

The commonly employed siliceous pigments used in rubber compounding applications can be used as the silica. For instance the silica can include pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3.

Tire tread formulations which include silica and an organosilicon compound will typically be mixed utilizing a thermomechanical mixing technique. The mixing of the tire tread rubber formulation can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-procuctive mix stage(s). The rubber, silica and sulfur containing organosilicon, and carbon black if used, are mixed in one or more non-productive mix stages. The terms "non-productive" and "productive" mix stages are well known to those having skill in the rubber mixing art. The sulfur vulcanizable rubber composition containing the sulfur containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

Tire tread compounds made using such styrene-isoprene rubber containing blends can be used in tire treads in conjunction with ordinary tire manufacturing techniques. Tires are built utilizing standard procedures with the styrene-isoprene rubber simply being included in the blend used as the tread rubber. After the tire has been built with the styrene-isoprene rubber containing blend, it can be vulcanized using a normal tire cure cycle. Tires made in accordance with this invention can be cured over a wide temperature range. However, it is generally preferred for the tires to be cured at a temperature ranging from about 132° C. (270° F.) to about 166° C. (330° F.) It is more typical for the tires of this invention to be cured at a temperature ranging from about 143° C. (290° F.) to about 154° C. (310° F.). It is generally preferred for the cure cycle used to vulcanize the tires to have a duration of about 10 to about 20 minutes with a cure cycle of about 12 to about 18 minutes being most preferred.

This invention is illustrated by the following examples that are merely for the purpose of illustration and are not to be regarded as limiting the scope of the invention or the manner in which it can be practiced. Unless specifically indicated otherwise, all parts and percentages are given by weight.

EXAMPLE 1

In a one-gallon (3.785 liter) glass bowl reactor equipped with a mechanical stirrer and temperature control via cooling water and low pressure steam, polymerization of the isoprene monomer was carried out. The reactor was charged with 2000 grams of premix, which contains 20% monomer dissolved in hexane solvent. The reactor contents were then heated to 65° C. At 65° C., a catalyst system consisting of a 0.75/1 ratio of sodium dodecylbenzene sulfonate (SDBS) to n-butyllithium (n-BuLi) was added to the reactor to initiate polymerization. Samples were taken over the course of the reaction to determine monomer conversion, which was presented as a function of time. The reaction was short-stopped with denatured ethanol, and antioxidant was added to the polymer. The polymer was dried for several days in an oven to make sure all solvent had evaporated.

EXAMPLE 2

Using the same reactor setup as Example 1, the copolymerization of styrene and isoprene was carried out. In this experiment a polymer containing 10% styrene and 90% isoprene was synthesized (10/90 SIR). Therefore, 200 grams of 20% styrene premix and 1800 grams of 20% isoprene premix were charged to the reactor. Once again, the reaction temperature was 65° C. and a ratio of 0.75/1 SDBS to n-BuLi was used to initiate polymerization. A target molecular weight of 150,000 was used. Samples were taken over time to monitor both styrene and isoprene monomer conversion as a function of time, monomer conversion as a function of total conversion, and the copolymer composition as a function of total conversion. Ethanol was used to short-stop the reaction and antioxidant was added upon completion. The polymer was then dried for several days in an oven to make sure all solvent had been evaporated.

EXAMPLES 3–7

Using the same procedure as described in Example 2, a series of SIR copolymers were synthesized. The series consisted of 20 to 60 percent styrene (20/80, 30/70, 40/60, 50/50 and 60/40 SIR). Therefore, the styrene and isoprene premixes were added to obtain the desired copolymer composition. The glass transition temperature was controlled by the amount of styrene in the copolymer. All final products were soluble in hexane solvent. Table 1 shows all the polymer characteristics for this series, including Example 2 and Example 8. The polymer glass transition temperature (Tg) was determined using differential scanning calorimetry techniques (DSC), while the number averave molecular weight (Mn) and polydispersity (PDI) were obtained through gel permeation chromatography (GPC), and the copolymer microstructure was found through proton NMR techniques. Table 2 gives the styrene sequence distribution as determined through ozonolysis techniques. Ozonolysis techniques are needed because it is difficult to obtain the amount of block styrene in styrene/isoprene copolymers through traditional NMR techniques.

EXAMPLE 8

Using a similar procedure as described in Example 2, a copolymer of 70% styrene and 30% isoprene was synthesized (70/30 SIR). Here the only difference in procedure was how the reactor was initially charged with premix. Approximately 1050 grams of styrene premix and 450 grams of isoprene premix along with 500 grams of cyclohexane were added to the reactor. This was then heated, and the catalyst was injected. The cyclohexane helped to keep the copolymer fully in solution. Without cyclohexane, the 70/30 SIR appeared to be a colloidal suspension.

TABLE 1

Polymer characteristics for SIR copolymers presented in Examples 2–8.

| Example | Tg (° C.) | Mn | PDI | % Styrene | % 1,4 PI | % 3,4 PI |
|---|---|---|---|---|---|---|
| 2 | −56.64 | 446,000 | 1.14 | 9.1 | 81.7 | 9.2 |
| 3 | −48.06 | 393,000 | 1.25 | 19.0 | 72.7 | 8.3 |
| 4 | −38.70 | 408,000 | 1.22 | 27.4 | 64.0 | 8.6 |

TABLE 1-continued

Polymer characteristics for SIR copolymers presented in Examples 2–8.

| Example | Tg (° C.) | Mn | PDI | % Styrene | % 1,4 PI | % 3,4 PI |
|---|---|---|---|---|---|---|
| 5 | −27.05 | 435,000 | 1.17 | 40.1 | 50 | 9.9 |
| 6 | −15.99 | 493,000 | 1.20 | 49.0 | 42.7 | 8.3 |
| 7 | −3.21 | 500,000 | 1.15 | 57.2 | 35.1 | 7.7 |
| 8 | 21.08 | 562,000 | 1.17 | 67.1 | 27.1 | 5.8 |

TABLE 2

Styrene Sequence Distribution for SIR in Examples 2–8.

| Sequence | 2 | 3 | 4 | 5 | 6 | 7 | 8 |
|---|---|---|---|---|---|---|---|
| 1S | 58.4 | 47.3 | 36.8 | 20.0 | 16.2 | 15.3 | 12.5 |
| 2S | 33.5 | 34.5 | 35.0 | 26.0 | 23.8 | 20.3 | 16.1 |
| 3S | 8.1 | 14.9 | 19.3 | 21.0 | 20.5 | 16.3 | 14.0 |
| 4S |  | 3.3 | 5.5 | 15.0 | 14.8 | 12.9 | 11.8 |
| 5S |  |  | 3.4 | 9.5 | 10.7 | 11.1 | 11.1 |
| 6S |  |  |  | 5.5 | 6.9 | 9.6 | 10.3 |
| 7S |  |  |  | 2.3 | 3.4 | 3.6 | 5.2 |
| 8S |  |  |  | 0.7 | 2.3 | 3.8 | 5.2 |
| 9S |  |  |  |  | 1.0 | 0.8 | 1.4 |
| 10S |  |  |  |  | 0.4 | 2.2 | 2.8 |
| 11S |  |  |  |  |  | 1.5 | 1.9 |
| 12S |  |  |  |  |  | 1.0 | 2.4 |
| 13S |  |  |  |  |  | 0.6 | 1.8 |
| 14S |  |  |  |  |  | 0.4 | 1.2 |
| 15S |  |  |  |  |  | 0.2 | 0.9 |
| 16S |  |  |  |  |  | 0.1 | 0.5 |
| 17S |  |  |  |  |  | 0.1 | 0.4 |
| 18S |  |  |  |  |  | 0.1 | 0.2 |
| 19S |  |  |  |  |  | 0.1 | 0.1 |
| 20S |  |  |  |  |  |  | 0.1 |
| 21S |  |  |  |  |  |  | 0.1 |

EXAMPLE 9

Using the reactor set-up in Example 1, a 45/55 styrene/isoprene copolymer was made via sodium mentholate (SMT). Approximately 900 g of styrene premix and 1100 grams isoprene premix, both in hexane solvent, were added to the reactor. To initiate polymerization a ratio of 0.25/1 SMT to n-BuLi was added to the reactor at a temperature of 65° C. A Tg of −17.4° C. resulted. The Mn of the polymer was 506,000 g/mol (a target Mn of 450,000 was used).

EXAMPLE 10

Using the reactor set-up in Example 1, a 45/55 styrene/isoprene copolymer was made via SDBS and 3-(T-butyldimethylsilyloxy)-2,2-dimethyl-1-propyllithium (PFI-2), a functionalized initiator. Approximately 900 g of styrene premix and 1100 grams isoprene premix, both in hexane solvent, were added to the reactor. To initiate polymerization a ratio of 0.5/1 SDBS to PFI-2 was added to the reactor at a temperature of 65° C. A Tg of −19.83° C. resulted. The Mn of the polymer was 433,900 g/mol (a target Mn of 225,000 was used).

EXAMPLE 11

Using the reactor set-up in Example 1, a 45/55 styrene/isoprene copolymer was made via sodium salt of di(ethylene glycol) methyl ether (NaDEGME) and n-BuLi. Approximately 900 g of styrene premix and 1100 grams isoprene premix, both in hexane solvent, were added to the reactor. To initiate polymerization a ratio of 0.25/1 NaDEGME to n-BuLi was added to the reactor at a temperature of 65° C. A Tg of −30.93° C. resulted. The Mn of the polymer was 298,600 g/mol (a target Mn of 200,000 was used).

EXAMPLE 12

Using the reactor set-up in Example 1, a 45/55 styrene/isoprene copolymer was made via sodium salt of di(ethylene glycol) dietheyl ether (NaDEGDEE) and n-BuLi. Approximately 900 grams of styrene premix and 1100 g isoprene premix, both in hexane solvent, were added to the reactor. To initiate polymerization a ratio of 0.25/1 NaDEGDEE to n-BuLi was added to the reactor at a temperature of 90° C. A Tg of −16.29° C. resulted. The Mn of the polymer was 378,500 g/mole (a target Mn of 250,000 was used).

EXAMPLE 13

Using the reactor set-up in Example 1, a 45/55 styrene/isoprene copolymer was made via sodium salt of tri(propylene glycol) methyl ether (NaTPGME) and n-BuLi. Approximately 900 grams of styrene premix and 1100 g isoprene premix, both in hexane solvent, were added to the reactor. To initiate polymerization a ratio of 0.25/1 NaTPGME to n-BuLi was added to the reactor at a temperature of 90° C. A glass transition temperature of −13.13° C. resulted. The number averave molecular weight (Mn) of the polymer was 328,700 grams/mole (a target Mn of 250,000 was used).

Variations in the present invention are possible in light of the description of it provided herein. It is, therefore, to be understood that changes can be made in the particular embodiments described which will be within the full intended scope of the invention as defined by the following appended claims.

What is claimed is:

1. An initiator system which is comprised of (a) a lithium initiator and (b) a sodium salt of a di-alkylated cyclohexanol, wherein said initiator system is void of polar modifiers, and wherein the molar ratio of the sodium salt of the di-alkylated cyclohexanol to the lithium initiator is within the range of about 0.01:1 to about 20:1.

2. An initiator system which is comprised of (a) a lithium initiator and (b) a sodium salt of a disubstituted cyclohexanol, wherein said initiator system is void of polar modifiers, and wherein the molar ratio of the sodium salt of the disubstituted cyclohexanol to the lithium initiator is within the range of about 0.01:1 to about 20:1.

3. An initiator system which is comprised of (a) a lithium initiator and (b) sodium mentholate, wherein said initiator system is void of polar modifiers, and wherein the molar ratio of the sodium mentholate to the lithium initiator is within the range of about 0.01:1 to about 20:1.

4. An initiator system as specified in claim 3 wherein the molar ratio of the sodium mentholate to the lithium initiator is within the range of about 0.05:1 to about 10:1.

5. An initiator system as specified in claim 3 wherein the molar ratio of the sodium mentholate to the lithium initiator is within the range of about 0.2:1 to about 3:1.

6. A process for preparing a rubbery polymer having a low vinyl content which comprises: polymerizing at least one diene monomer with a lithium initiator at a temperature which is within the range of about 5° C. to about 100° C. in the presence of sodium mentholate, wherein the molar ratio of the sodium mentholate to the lithium initiator is within the range of about 0.05:1 to about 10:1, and wherein the process is conducted in the absence of polar modifiers.

7. A process as specified in claim 6 wherein the lithium initiator is an alkyl lithium compound.

8. A process as specified in claim 7 wherein the molar ratio of the sodium mentholate to the lithium initiator is within the range of about 0.05:1 to about 10:1.

9. A process as specified in claim 8 wherein the polymerization is conducted at a temperature which is within the range of about 40° C. to about 90° C.

10. A process as specified in claim 6 wherein said polymerization is conducted in an inert organic solvent.

11. A process as specified in claim 6 wherein the molar ratio of the sodium mentholate to the lithium initiator is within the range of about 0.2:1 to about 3:1.

12. A process as specified in claim 11 wherein the lithium initiator is n-butyl lithium.

13. A process as specified in claim 12 wherein the polymerization is conducted at a temperature which is within the range of about 60° C. to about 90° C.

14. A process as specified in claim 6 wherein the rubbery polymer is coupled after the polymerization has been completed.

15. A process as specified in claim 11 wherein the coupling is carried out utilizing a tin tetrahalide.

* * * * *